United States Patent [19]

Fulford et al.

[11] Patent Number: 5,030,424
[45] Date of Patent: Jul. 9, 1991

[54] RECOVERY OF RARE EARTH ELEMENTS FROM BAYER PROCESS RED MUD

[75] Inventors: George D. Fulford; Gordon Lever; Taichi Sato, all of Kingston, Canada

[73] Assignee: Alcan International Limited, Montreal, Canada

[21] Appl. No.: 381,537

[22] Filed: Jul. 18, 1989

[30] Foreign Application Priority Data

Apr. 3, 1989 [CA] Canada .................................. 595496

[51] Int. Cl.$^5$ ............................................ C01F 17/00
[52] U.S. Cl. ................................................ 423/21.5
[58] Field of Search ....................................... 423/21.5

[56] References Cited

U.S. PATENT DOCUMENTS 3,159,452 12/1964 Lerner .
3,311,449 3/1967 Atsukawa et al. .
3,574,537 4/1971 Jui-Hsiung Tsai .
4,668,485 5/1987 Cresswell et al. .................. 423/119

OTHER PUBLICATIONS

Chemical Abstract 82:158985c.
Chemical Abstract 90:9636c.
Chemical Abstract 92:79947v.
Chemical Abstract 93:118027n.

Primary Examiner—Melvyn J. Andrews
Attorney, Agent, or Firm—Cooper & Dunham

[57] ABSTRACT

A process for the recovery of rare earth elements from Bayer Process red mud includes the following steps: (a) digesting red mud containing rare earth elements with a dilute acid solution, e.g. sulphur dioxide dissolved in water, to selectively dissolve the rare earth elements while leaving iron in the red mud substantially undissolved; (b) separating the solution obtained from the solid residue and (c) recovering the rare earth elements from the solution.

22 Claims, 3 Drawing Sheets

RECOVERY OF RARE EARTH ELEMENTS FROM BAYER PROCESS RED MUD

This invention relates to a process for recovering rare earth elements from red mud produced as a waste byproduct in manufacturing alumina from bauxite.

The Bayer process for producing alumina comprises, as its first step, leaching or digesting bauxite or similar crude ores with a solution of sodium hydroxide to extract alumina minerals contained therein as a solution of sodium aluminate. At the same time, as much as one third to one half of the total weight of the crude ore used is discharged as a residual red mud. This red mud typically contains substantial amounts of silica, alumina, iron oxide, titania and sodium compounds. Many red muds also contain small but valuable quantities of rare earth elements, and in some cases include significant quantities of scandium and yttrium.

It would be highly desirable to be able to economically recover the rare earth elements because several of these are commercially valuable. However, the only procedures presently available for their extraction from red mud are a primary smelting of red mud to remove Fe as metallic iron, followed by total acid dissolution of the slag and recovery of rare earth elements from the resulting acid solution, or dissolving the total red mud in strong acid and recovery of rare earth elements from the acid solution. However, such procedure is not economically viable for the quantities of rare earth elements available in the bauxites. Moreover, the presence of large amounts of iron oxide in the bauxite makes separation of the rare earth elements particularly difficult because of the difficulty of separating these from the iron oxide without excessive consumption of reagents.

Various processes have been described for recovering valuable components from red mud and one such process is described in U.S. Pat. No. 3,311,449, issued Mar. 28, 1967. It utilizes a process comprising the steps of absorbing gaseous sulphur dioxide by a slurry including red mud of a suitable concentration to separate and recover the sodium component; adding water to the resulting residue to form an aqueous suspension; reacting gaseous sulphur dioxide on the aqueous suspension to dissolve alumina and silica, separating the solution from the insoluble material which includes iron oxide and titanium dioxide; heating the resulting solution to drive off some of the gaseous sulphur dioxide which is supplied to the preceding steps and to deposit silica for the purpose of recovering same; further heating the remaining solution to drive off some of the gaseous sulphur dioxide which is also supplied to the preceding steps and to deposit and separate basic aluminum bisulfite which, in turn, is calcined into alumina. However, the above process does not consider the possibility of being able to separate rare earth elements from the red mud.

Another process for separating useful compounds from red mud is described in U.S. Pat. No. 3,574,537, issued Apr. 13, 1971. In this procedure, the red mud is once again digested with sulphur dioxide in the presence of water to selectively dissolve such components as alumina, silica and the sodium component, while leaving iron oxide and titanium dioxide essentially undissolved. The dissolved components were then separated by precipitation from the solution. Again, no mention was made of the possibility of separating rare earth elements from the red mud.

It is an object of the present invention to provide a simple and inexpensive process for recovering rare earth elements from red mud.

SUMMARY OF THE INVENTION

According to the present invention it has been surprisingly discovered that rare earth elements can very economically be separated from Bayer process red mud by the steps of: (a) digesting red mud with a dilute acid solution to obtain a final digestion slurry having a pH of about 1.8-3 to selectively dissolve the rare earth elements, along with sodalite and calcium compounds while leaving iron and titanium in the red mud substantially undissolved; (b) separating residual solids from the solution obtained and (c) recovering the rare earth elements from the solution.

It has been surprisingly found according to this invention that rare earth elements in many red muds are readily leachable in dilute acids, e.g. mineral acids, while the same rare earth elements cannot be easily leached from the parent bauxite with the same acid solution. The term "rare earth elements" as used herein includes those elements having atomic numbers from 57 to 71 inclusive, as well as scandium and yttrium. Examples of suitable acids include HCl, $HNO_3$, $H_2SO_4$, $H_2SO_3$, etc.

An important feature of this invention is the discovery that a dilute acid in the form of $SO_2$ in water can be used to selectively leach rare earth elements out of red mud without the concurrent dissolution of all of the iron compounds. This selective leaching of the rare earth elements also means that less difficulty is experienced in the extraction step. Carrying out the leach at moderate temperatures, close to the ambient temperature, further reduces the dissolution of iron while leading to adequate recovery of the rare earth elements.

In the procedure of the invention, washed red mud from the Bayer process in the form of a slurry or cake is preferably mixed with an aqueous solution of sulphurous acid, or alternatively gaseous sulphur dioxide is introduced into an aqueous slurry of red mud or the red mud is suspended in an aqueous solution of sulphurous acid and additional gaseous sulphur dioxide is introduced into the slurry. The acid digestion may be carried out in either one or several stages. In a two stage digestion, the pH of the slurry is initially lowered to about 2.6 to 3.2 whereby much of the soda, alumina and silica from the sodalite-type desilication products and some of the calcium minerals are dissolved from the red mud and go into solution. This solution is separated from the insoluble materials which are then contacted with a weakly acidic solution of $SO_2$ such that the slurry is lowered to a pH of about 1.8-2.5. This dissolves the rare earth elements and further of the soda, alumina and silica and part of the secondary calcium minerals from the insolubles. The rare earth elements are extracted from this leachate or solution. The double leach method can be further refined by splitting the second leach into two stages, one ending at a slurry pH of 2.0 to 2.4, and the second ending at a slurry pH of 1.5 to 2.0, to give a total of three leaching stages. The third leachate contains a part of the rare earths with especially few dissolved impurities.

In the single stage procedure, the slurry pH is lowered to about 2.0 so that the soda, alumina and silica are dissolved along with the rare earth elements. The rare earth elements are then extracted from this entire leachate or solution.

The rare earth elements can be quite easily recovered from the leachate or solution by known means, such as by the selective precipitation and removal of sparingly soluble salts upon the addition of soluble oxalates, fluorides, carbonates, or by treatment with ammonium or sodium hydroxide to precipitate the insoluble hydroxides, or by ion exchange using solid ion exchange resins in a column.

However, it has been found that it is particularly advantageous to recover the rare earths by solvent extraction. In the solvent extraction stage, the leachate or liquor containing the rare earth elements along with metal impurity values associated therewith is contacted with a substantially water-immiscible liquid organic extractant comprising a solution of one of a family of phosphorus-containing extraction agents. These are typically esters of phosphoric acid, such as di-2-ethylhexyl phosphoric acid (DEHPA), or esters of phosphonic acid such as 2-ethylhexyl phosphonic acid mono-2-ethylhexyl ester (EHEHPA), or esters of phosphinic acid, such as di-2,4,4-trimethylpentyl phosphinic acid, e.g. CYANEX 272 made by American Cyanamid, or esters of thiophosphinic acid, such as CYANEX 301, made by American Cyanamid, or mixtures of any of the above with any one or more of tributyl phosphate (TBP) or trioctylphosphine oxide (TOPO), etc.

The extraction is normally carried out with the extractant dissolved in a suitable organic diluent which is a substantially water-immiscible liquid in which both the extractant and the extractant containing metal values are soluble. Examples of suitable diluents are kerosene, aliphatic hydrocarbons, aromatic hydrocarbons, halogenated aliphatic and aromatic hydrocarbons, fuel oils, and the like. In terms of cost and suitability, kerosene is particularly preferred.

In a more specific embodiment of the extracting procedure, the leachate or liquor is adjusted to a pH of about 1.5 to 2.0 and this is contacted with an organic solution containing from 0.05 to 0.1 mols/l of the phosphorus-containing organic extractant, whereby rare earth elements of atomic number from 65 to 71 and yttrium, along with part of the Gd, Nd and Ca are extracted into the organic phase. The organic and aqueous phases are separated and the pH of the aqueous phase is then adjusted to a range between 2.0 and 2.5 either by heating to volatilize some of the $SO_2$ or sulphurous acid, or by the addition of a small amount of base. This solution is then subjected to a solvent extraction using a solution containing 0.1 to 0.2 mols/l of the above organic extractant, whereby the rare earth elements of atomic number from 63 to 57, and some further Ca and Al are extracted from the aqueous phase. The organic and aqueous phases are then separated.

Another embodiment of the extraction procedure comprises the steps of adjusting the pH of the leachate or liquor to about 1.5 to 2.0 and subjecting this solution to solvent extraction with an organic solution containing from 0.2 to 0.3 mols/l of phosphorus-containing extracting agent whereby the rare earth elements of atomic number from 57 to 71, Sc, Y and some Ca and Al are extracted from the aqueous phase into the organic phase.

For both the single and double or multiple stage extraction procedures, the organic and aqueous phases are then separated and the organic solvent obtained from the extraction step and containing the rare earths and calcium is optionally washed with dilute acid. The dilute acid is preferably 0.1 to 0.2 mols/l sulphurous or other mineral acid and this serves to strip much of the calcium from the organic solvent and transfer it to the aqueous phase without transferring any significant amounts of the useful rare earth elements except lanthanum, and the lightest rare earths.

The optionally washed organic solvent still loaded with the rare earth elements is then treated with a moderately concentrated aqueous solution of mineral acid to transfer the rare earth elements of atomic number from 57 to 71 but typically not the scandium from the organic to the aqueous phase. The preferred acid for this purpose is dilute $HNO_3$, about 1-3 molar, but 1-6 molar HCl and 1-6 molar $H_2SO_4$ can also be used. All other rare earths except scandium are in aqueous acidic solution at this point, and the addition of the neutralizing or precipitating agent then causes the precipitation of the mixed rare earths, e.g. as rare earth hydroxides or carbonates etc.

The acid stripped organic solvent may then be treated with a moderately concentrated aqueous solution of alkali, such as 1-2 molar NaOH, to strip the scandium from the organic extracting agent and transfer it to the aqueous solution and precipitate it there in solid form. All of the organic phase can then be recycled to the extraction step.

A further advantageous feature of the present invention resides in the fact that a large part of the acid values used in leaching can be recovered and used again in the process. Thus, the acid values from the leachates and the solution from which the rare earths have been recovered may be combined and subjected to a recovery process in which the solutions are heated to volatilize the sulphur dioxide thereby raising the solution to pH 2.4-3.0. The dissolved $SiO_2$ values are thereby precipitated. The volatilized $SO_2$ is collected in water to form a solution of sulphurous acid for recycling. The precipitated $SiO_2$ is separated from the solution.

The above solution, essentially freed of $SiO_2$, is then further heated to volatilize still more $SO_2$ or sulphurous acid, to raise the pH from about 3.2 to 4.0, whereupon the dissolved $Al_2O_3$ values are precipitated. Again, the volatilized $SO_2$ is collected and converted to sulphurous acid to be recycled to the leaching step. The precipitated $Al_2O_3$ values are separated from the solution. In another alternative method, the $SO_2$ can be recovered in a single operation by heating the solutions until the pH changes sufficiently (the pH increases) to cause the precipitation of both $SiO_2$ and $Al_2O_3$.

The above solution, essentially freed of precipitated $Al_2O_3$, is then further treated to recover the sodium hydroxide values. For example, one way of achieving this is by adding calcium hydroxide whereby a precipitate of calcium sulphite is made and sodium hydroxide is produced in the solution. The calcium sulphite solids are separated from the solution and the remaining solution containing NaOH can be recycled to the Bayer process.

In the specification and claims, all references to the pH refer to measurements made with a glass electrode, properly standardized against buffer solutions. As indicated, the pH was measured of both the slurry containing the suspended solids, and of the clear filtrate obtained by filtering these suspensions. It has been observed that the pH of the slurry is not always the same as the pH of the filtrate, this being caused by the presence of suspended material in the suspension.

The invention will become more readily apparent from the following detailed description taken in conjunction with the accompanying drawings in which.

Figure 1:
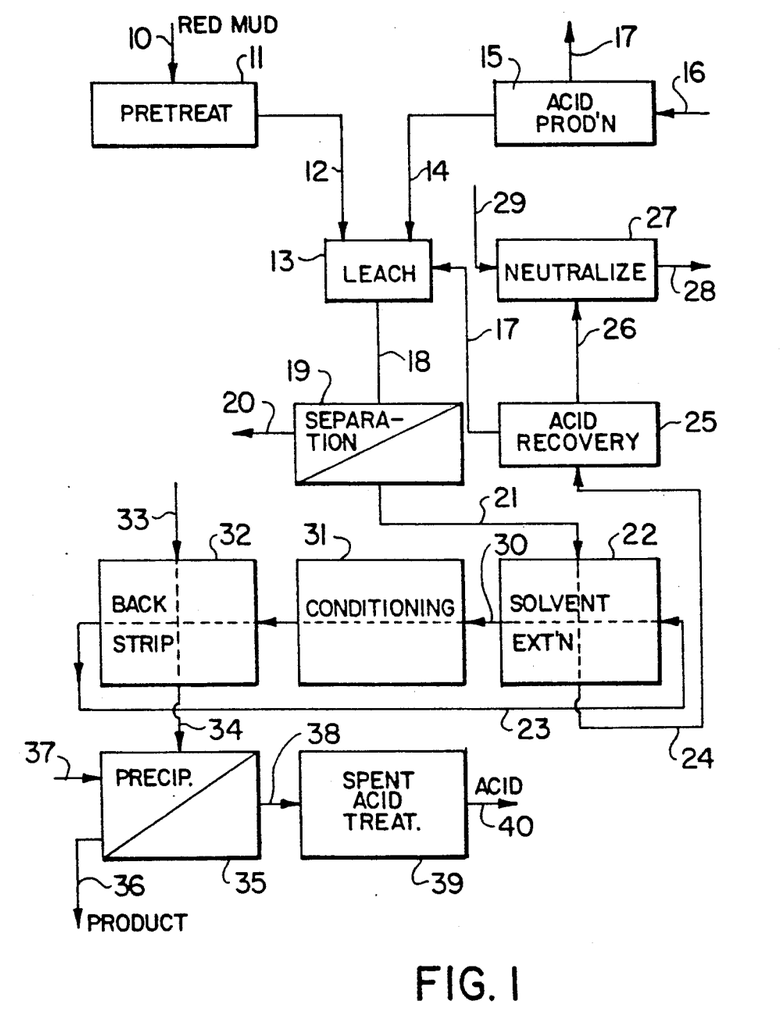
FIG. 1 shows a flow sheet illustrating in block form a series of steps according to the teachings of the invention.

As shown in FIG. 1, red mud slurry 10 is received from a Bayer plant and may optionally be subjected to a pretreatment stage 11 to remove residual soda-containing liquor. The pretreated red mud is transferred via line 12 to a leaching stage 13 where it is contacted with a solution of sulphur dioxide and water. This is formed in stage 15 with the raw materials (SO₂ and water) being introduced via lines 16 and the sulphur dioxide dissolved in water being transferred to the leaching stage 13 via line 14. Recycled gaseous SO₂ may also be added via line 17 or after being dissolved in an aqueous stream.

The leach slurry from the leaching stage 13 is transferred via discharge line 18 to a separating stage 19. This may conveniently be in the form of filtration or sedimentation with the leached solid residue being collected via discharge 20 for washing to recover soluble values prior to disposal and the filtrate or leachate liquor being withdrawn through line 21 and transferred to a solvent extraction stage 22. Optionally, leaching may be carried out in several steps at decreasing pH values with intermediate solid-liquid separations.

The solvent extraction stage 22 may conveniently be a conventional mixer-settler apparatus in which the leachate liquor 21 comes into contact with an organic phase 23 containing an organo-phosphorus compound as extractant. After contacting the organic and leachate liquor for a period of time depending upon such factors as the volume ratio of organic to aqueous, the resulting rare earth-containing organic phase and the extracted aqueous phase (raffinate) are allowed to physically disengage after which they are separated from each other by conventional liquid-liquid separation techniques such as drawing the aqueous phase from the bottom of the settler. Thus, the loaded organic phase is drawn off through line 30 and the aqueous (raffinate) phase is drawn off through bottom discharge line 24.

The raffinate 24 from the rare earth extraction is recycled through acid recovery stage 25 with recovered acid 17 being recycled back to the leaching stage 13. Typically silica and alumina compounds are precipitated in turn during the acid recovery operation, and may be recovered together or separately if desired. The remainder of the raffinate 26 proceeds to a raffinate neutralization stage 27 where it is contacted by a neutralizing agent 29 with the neutralized raffinate being recovered through discharge 28. Optionally, caustic soda may be recovered for recycle to the Bayer plant at this point.

The loaded organic 30 from the rare earth extraction stage is optionally passed through a conditioning unit 31 and then into a backstripping unit 32 where it is backstripped by means of a mineral acid solution 33. The organic phase passing through the backstripping operation becomes the recycled organic phase 23 to the solvent extraction stage 22, while the aqueous discharge 34 from the backstripping operation 32 discharges to a precipitation and product recovery unit 35. Here, a precipitant 37 is added and the precipitated rare earth compounds are recovered via discharge 36, while the liquid phase is discharged through line 38 to a spent acid treatment 39, with the spent acid being disposed at 40. The solvent extraction and backstripping stage may optionally be carried out in multiple steps to obtain separate fractions of the total rare earths present.

The process is further described by reference to the following examples.

EXAMPLE 1

A series of rare earth extractions were conducted on a red mud obtained from a Jamaican bauxite. The red mud had the following composition (dry basis): 52.0% $Fe_2O_3$, 6.5% $TiO_2$, 18.0% L.O.I., 12.9% $Al_2O_3$, 2.4% $SiO_2$, 1.6% $Na_2O$, 5.0% CaO, 0.6% $P_2O_5$ and 1.0% other materials, including 0.1-0.2% total rare earths.

The red mud was added to 350 ml of sulphurous acid solutions at various concentrations in varying liquid:solid ratios (L:S) and stirred constantly at temperatures between 10° and 70° C. Sulphur dioxide was passed through the digestion slurry during the mixing at a gas rate of 150 cm³/min (measured at atmospheric pressure) and after a digestion of 15 minutes, the insoluble residue was separated from the liquor and washed.

pH measurements were taken of the initial liquor, the final slurry and the filtrate. The residual solids were then added to a further portion of the sulphurous acid solution, and a second leach was carried out at a lower pH value than the first, after which the remaining insoluble residues were separated, and the pH values of the final slurry and filtrate were noted. Optionally, the second residue could be further contacted with sulphurous acid solution to carry out a third successive leach.

(a) The leach liquors from double leaching tests were subjected to analysis and the results are shown in Table I below.

(b) A triple leaching test was also conducted at a liquid:solid ratio of 10:1, an initial liquor pH of 1.3, a leaching time of 15 min., a gas rate of 150 cm³/min and 100% SO₂. The results are shown in Table II below.

The results contained in TABLE I show that it is possible, by careful control of the intermediate pH value to carry out a double leach in which the first leachate solution contains very little of the total rare earth values, as exemplified by the Y content (which is typical of the behaviour of most of the rare earths), while the second leachate contains the bulk of the rare earths values and a reduced loading of Na, Al, Si, Ca, a part of which is removed in the "barren" first leachate, while maintaining a satisfactory overall recovery of the rare earths. The results of TABLE 1 also indicate that the dissolution of iron is very small, especially as the leaching temperature is reduced.

The results of TABLE 2 further show that it is possible to split the rare earth containing leachate into a major stream, (leachate 2) and a smaller stream (leachate 3) containing a greatly reduced level of impurities from which a side stream of rare earth concentrate of improved quality can be obtained.

TABLE I

| Run No. | Leach No. | Leach Conditions ||||| Final Slurry pH | Final Filtrate pH | Leachate Soln. Analyses |||||||
|---|---|---|---|---|---|---|---|---|---|---|---|---|---|---|
| | | L:S Ratio | Temp. °C. | Init. pH of Liquor | % Vol. SO$_2$ in Gas | | | Na ppm | Al ppm | Si ppm | Fe ppm | Y ppm | % Y EXTRD | Tot % Y EXTR |
| 1 | 1 | 4:1 | 10 | 1.5 | 2 | 5.85 | 2.66 | 1873 | 2.2 | 123 | 2.9 | 0.2 | 0.1 | |
| | 2 | 10:1 | 70 | 1.1 | 100 | 2.00 | 1.99 | 580 | 722 | 564 | 91.7 | 75.9 | 80.8 | 80.9 |
| 2 | 1 | 4:1 | 70 | 1.1 | 100 | 3.77 | 2.45 | 2448 | 62.3 | 806 | 5.3 | 12.5 | 6.6 | |
| | 2 | 10:1 | 70 | 1.1 | 2 | 2.40 | 2.27 | 229 | 532 | 324 | 115.6 | 68.2 | 72.7 | 79.3 |

TABLE 2

| Leach No. | Slurry pH | Filtrate pH | Leachate Soln. Analyses |||||||
|---|---|---|---|---|---|---|---|---|---|
| | | | Na ppm | Al ppm | Si ppm | Fe ppm | Ca ppm | Y ppm | % Y EXTR. | Tot % Y EXTR |
| 1 | 3.95 | 3.13 | 653 | 99 | 599 | 3.3 | >1000 | 10.7 | 13.6 | |
| 2 | 2.25 | 2.35 | 89 | 379 | 116 | 14.0 | >1000 | 42.7 | 54.4 | |
| 3 | 1.35 | 1.55 | 17 | 151 | 19 | 16.4 | 293 | 13.6 | 17.3 | 85.3 |

EXAMPLE 2

Figure 2:
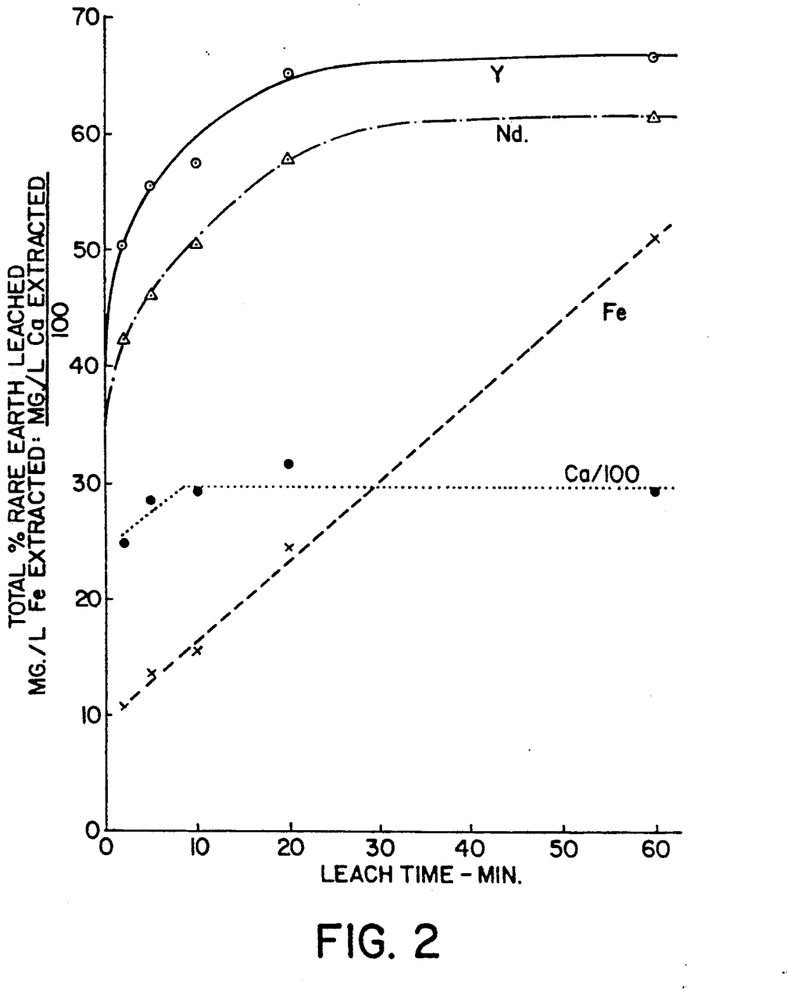
FIG. 2 is a graph showing extractions with leaching times.

A series of tests were conducted to determine the effect of leaching time on the cumulative total percentage of rare earths leached, the amount of iron leached and the amount of calcium leached. The same red mud was used as in Example 1 and the leaching conditions and results are shown in Table 3 below and the results are also plotted in FIG. 2. Again, the behaviour of the yttrium, as shown by its percentage extraction, can be taken as being typical of the behaviour of the other rare earths The results of FIG. 2 indicate that beyond a leaching time of 20 minutes there is essentially no increase in the amount of rare earths leached out of the red mud under these conditions whereas the iron continues to leach out of the red mud at a steady rate earth elements except Pm were also present in the solution.

| Element | Conc. in ppm (wt) |
|---|---|
| Y | 33.7 |
| La | 30.6 |
| Ce | 27.1 |
| Pr | 6.8 |
| Nd | 20.5 |
| Eu | 0.9 |
| Gd | 4.5 |
| Dy | 3.3 |
| Ho | 0.9 |
| Er | 2.1 |
| Fe | 53 |
| Al | 341 |
| Na | 324 |
| Si | 48 |
| Ca | 1222 |

TABLE 3

| Run No. | Leach No. | Leach Conditions |||||| Final Slurry pH | Final Filtrate pH | Final Filtr. g/L H$_2$SO$_3$ |
|---|---|---|---|---|---|---|---|---|---|---|
| | | Time Min | L:S Ratio | Temp. °C. | Init. pH of Liq. | Gas Flow cm$^3$/ | % Vol. SO$_2$ in Gas | | | |
| 1 | 1 | 2 | 4:1 | 30 | 1.5 | 150 | 2 | 5.75 | 2.15 | 0.07 |
| | 2 | 2 | 8:1 | 30 | 1.1 | 150 | 100 | 1.75 | 1.85 | 8.57 |
| 2 | 1 | 5 | 4:1 | 30 | 1.5 | 150 | 2 | 5.25 | 2.70 | 0.40 |
| | 2 | 5 | 8:1 | 30 | 1.1 | 150 | 100 | 1.85 | 1.85 | 8.62 |
| 3 | 1 | 10 | 5:1 | 30 | 1.5 | 150 | 2 | 5.40 | 2.65 | 0.53 |
| | 2 | 10 | 8:1 | 30 | 1.1 | 150 | 100 | 1.80 | 1.75 | 9.49 |
| 4 | 1 | 20 | 4:1 | 30 | 1.5 | 150 | 2 | 6.45 | 2.55 | 0.58 |
| | 2 | 20 | 8:1 | 30 | 1.1 | 150 | 100 | 3.95 | 1.85 | 13.37 |
| 5 | 1 | 60 | 4:1 | 30 | 1.5 | 150 | 2 | 5.75 | 2.45 | 1.02 |
| | 2 | 60 | 8:1 | 30 | 1.1 | 150 | 100 | 1.40 | 1.50 | 15.56 |

| Run No. | Leach No. | Leachate Soln. Analyses |||||||
|---|---|---|---|---|---|---|---|---|
| | | Na ppm | Al ppm | Si ppm | Fe ppm | Ca ppm | Y ppm | % Y EXTRD | Tot % Y EXTRD |
| 1 | 1 | 1587 | 2.8 | 120 | 2.4 | 732 | 0.5 | 0.3 | |
| | 2 | 628 | 524 | 464 | 10.6 | 2465 | 46.6 | 49.6 | 50.2 |
| 2 | 1 | 2002 | 2.8 | 78 | 1.9 | 186 | 0.2 | 0.1 | |
| | 2 | 635 | 557 | 498 | 13.8 | 2848 | 523 | 55.7 | 55.8 |
| 3 | 1 | 2066 | 3.2 | 86 | 2.9 | 180 | 0.2 | 0.1 | |
| | 2 | 614 | 572 | 510 | 15.6 | 2934 | 53.8 | 57.3 | 57.4 |
| 4 | 1 | 2086 | 2.7 | 84 | 3.8 | 191 | 0.2 | 0.1 | |
| | 2 | 549 | 663 | 554 | 2.3 | 3176 | 61.6 | 65.6 | 65.7 |
| 5 | 1 | 2062 | 3.3 | 94 | 4.8 | 260 | 0.4 | 0.2 | |
| | 2 | 505 | 675 | 489 | 51.0 | 2953 | 62.3 | 66.4 | 66.6 |

EXAMPLE 3

Solvent extractions were conducted on leachate solutions obtained according to a procedure of Example 1 and having the typical analysis given below. Other rare Some variations in the starting solution occurred depending on the pH of the leaching step, as noted earlier, especially with respect to the main impurities in solution (Al, Na, Si, Ca), but the example shown above is typical of the rare-earth levels in a leach without recycle of reagents. Clearly further concentration of the rare earth elements could be achieved.

The aqueous sulphurous acid leach solutions at initial pH values of 1.47, 2.05, 2.49, were then contacted with an organic phase at an aqueous:organic volume ratio of 1:1, where the organic phase consisted of a solution of EHEHPA (2-ethylhexyl phosphonic acid mono-2-ethylhexyl ester) in kerosine by manual shaking in a separatory funnel at room temperature for times of 2 minutes to 30 minutes. The concentration of the extractant in the kerosine varied from 0.05M to 0.2M.

At the end of the contacting period, the organic and aqueous phases were allowed to separate by standing, and the aqueous phase was drained off and re-analyzed. The extraction of each element was obtained by difference from the original aqueous solution analysis, and the degree of extraction of rare earth element was expressed as a percentage of the original quantity present.

Table 4 presents a part of the results for the case of 0.1M EHEHPA in kerosine as the extractant.

Finally, the organic phase was contacted for 5 minutes each with six portions of 3M $HNO_3$ solution by shaking in a separatory funnel at room temperature in the presence of a few drops of 2-ethyl-1-hexanol using a total aqueous: organic phase ratio of 6:5. All of the aqueous portions were combined, and the combined aqueous phase was analyzed for rare earths and the major impurities, and these analyses were corrected back to the original aqueous phase volume basis. From this, back stripping efficiencies were calculated for the rare-earths, which were found to be essentially 100% for all the rare earths under these conditions.

Table 4 shows the impurity concentrations (ppm.wt. on original volume basis) found typically in the back-strip solutions for the case of 0.1M EHEHPA in kerosine as the extractant and 3M $HNO_3$ as the strippant.

Figure 3:
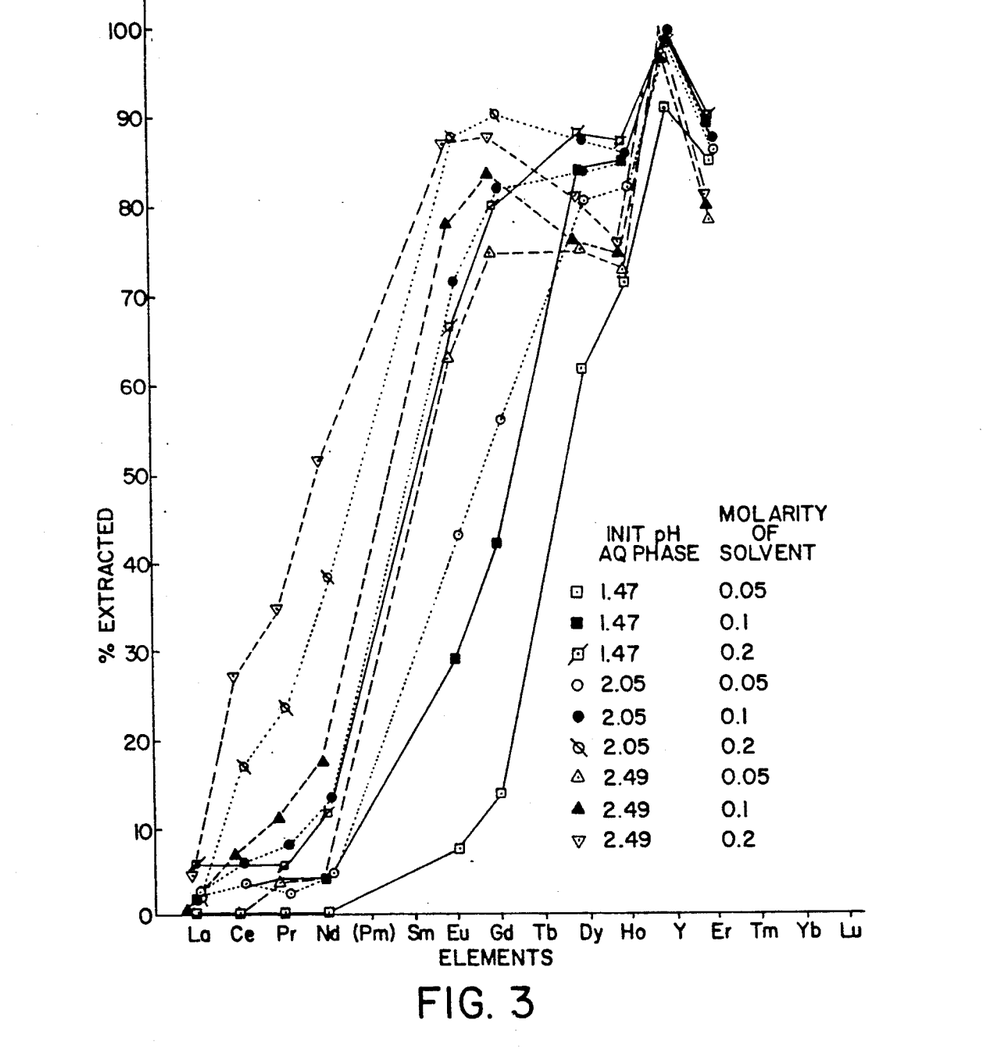
FIG. 3 is a graph showing extractions during solvent extraction.

Finally, FIG. 3 shows a summary of all the results obtained in this way at an extraction time of 10 minutes for three EHEHPA concentrations in kerosine as the extractants and three starting pH values in the initial aqueous solutions.

The results in FIG. 3 show clearly that surprisingly an excellent split at the solvent extraction stage can be obtained in which yttrium and the heavier rare earths can be selectively solvent extracted into the organic phase (and subsequently transferred into an aqueous phase to permit recovery of a "heavy+Y" rare earth concentrate and recycle of the stripped organic phase) by operating at a relatively low initial value of the aqueous phase pH and/or a very dilute extractant concentration in the organic phase. A subsequent second extraction on the same solution with a more concentrated organic phase and/or at a higher initial pH of the aqueous phase permits recovery of a middle rare earth concentrate, etc. The point of the splits between fractions is easily adjusted by adjusting the two parameters noted.

TABLE 4

| Initial Aqueous Phase pH | Extraction Time min. | % Extraction ||||||||||| ppm Impurities in Backstrip |||||
|---|---|---|---|---|---|---|---|---|---|---|---|---|---|---|---|---|
| | | La | Ce | Pr | Nd | Eu | Gd | Dy | Ho | Y | Er | Fe | Al | Na | Si | Ca |
| 1.47 | 2 | 0.2 | 0.3 | 0 | 0.3 | 32.2 | 47.9 | 73.5 | 74.1 | 98.3 | 78.8 | <1.3 | 21.0 | 0.46 | 0.78 | 4.31 |
| 1.47 | 5 | 1.1 | 0.8 | 0 | 0 | 28.9 | 42.8 | 84.9 | 84.0 | 98.2 | 89.0 | <1.3 | 31.6 | 0.55 | <0.25 | 4.61 |
| 1.47 | 10 | 1.7 | 3.0 | 4.1 | 3.8 | 28.9 | 41.8 | 83.6 | 84.0 | 98.0 | 88.8 | 2.4 | 41.7 | 0.40 | <0.25 | 4.00 |
| 1.47 | 30 | 4.2 | 7.3 | 8.6 | 0 | 27.6 | 42.6 | 74.7 | 78.5 | 98.0 | 82.8 | 3.7 | 46.9 | 1.09 | 1.00 | 3.97 |
| 2.05 | 2 | 3.2 | 10.8 | 15.5 | 24.7 | 82.2 | 87.0 | 82.7 | 83.7 | 99.7 | 87.0 | <1.3 | 65 | 0.61 | 0.30 | 4.80 |
| 1.95 | 5 | | | | | | | | | | | <1.3 | 98 | 0.47 | 0.33 | 3.99 |
| 2.05 | 10 | 3.5 | 5.9 | 7.5 | 13.3 | 71.4 | 81.9 | 83.6 | 84.2 | 99.6 | 87.2 | <1.3 | 129 | 0.55 | 0.49 | 5.04 |
| 1.92 | 15 | | | | | | | | | | | <1.3 | 104 | 0.26 | <0.25 | 3.73 |
| 2.00 | 30 | 0 | 0 | 0 | 5.2 | 61.8 | 76.2 | 75.9 | 79.4 | 99.5 | 80.4 | 3.0 | 118 | 0.95 | 1.02 | 3.86 |
| 2.49 | 2 | 3.7 | 16.1 | 25.5 | 35.3 | 85.6 | 87.7 | 82.6 | 79.8 | 99.6 | 84.1 | 6.0 | 101 | 1.63 | 2.23 | 5.30 |
| 2.49 | 5 | 0 | 2.8 | 12.1 | 7.5 | 74.3 | 83.3 | 81.5 | 78.1 | 99.5 | 82.0 | 7.0 | 125 | 1.30 | 1.32 | 5.03 |
| 2.49 | 10 | 0.2 | 6.9 | 10.6 | 17.2 | 77.6 | 83.2 | 76.8 | 74.3 | 99.5 | 79.4 | 6.3 | 176 | 1.05 | 0.84 | 4.08 |
| 2.49 | 30 | 0 | 0 | 4.9 | 5.7 | 67.0 | 81.3 | 79.9 | 78.5 | 99.3 | 81.9 | 8.9 | 142 | 1.89 | 1.39 | 4.13 |

EXAMPLE 4

Sulphurous acid leach solutions were solvent-extracted at room temperature using an organic phase consisting of 0.2M DEHPA in kerosine with a volume ratio of the aqueous: organic phases of 1:1, leading to organic phases with the concentrations of typical rare earth elements and impurities shown in Table 5, in the rows labelled "Initial Organic Phase".

50 mL portions of these organic phases were contacted by shaking for 5 minutes at room temperature with one or more successive portions of 10 mL each of very dilute aqueous acid solutions (0.12M $H_2SO_3$, 0.05M HCl, $HNO_3$, $H_2SO_4$) in the presence of a few drops of an alcohol modifier. The aqueous and organic phases were then allowed to separate, and finally the quantity of each metal extracted into the combined aqueous wash phase was determined in each case by analysis of the aqueous phases, and is reported in Table 5 as a percentage of the quantity initially present in the organic phase subjected to washing.

As seen from Table 5, the percentages of the middle and heavy rare earths and yttrium removed by the washing operation are negligibly small, while significant portions of the iron and especially calcium impurities are removed, together with intermediate quantities of the lightest rare earth elements.

By carrying out such a wash of the organic phase with very dilute mineral acid solutions, it is therefore possible to obtain a purer rare earth concentrate after the subsequent backstripping of the washed organic phase with a more concentrated acid solutions, such as, for instance, 3M $HNO_3$. However, this is done at the cost of losing in the wash solution some portion of the light rare earth metals which are typically of low commercial value.

TABLE 5

| Acid | Applicn. | DILUTE ACID WASH OF ORGANIC PHASE AT ROOM TEMPERATURE | | | | | | | | | | | | |
|---|---|---|---|---|---|---|---|---|---|---|---|---|---|---|
| | | Solution | La | Ce | Pr | Nd | Eu | Gd | Dy | Ho | Y | Er | Fe | Al | Ca |
| 0.12 M.H$_2$SO$_3$ | 6 × 10 ml, | Init. Org. Phase, ppm* | 16.9 | 20.2 | 4.25 | 19.4 | 0.79 | 4.21 | 3.53 | 0.67 | 39.6 | 1.97 | 5.5 | 272 | 151 |
| | | % Removed by Wash | 50.3 | 44.3 | 48.6 | 32.2 | 7.5 | 4.3 | 2.3 | 9.6 | 0.07 | 5.8 | 50.2 | 2.5 | 35.0 |
| | | Init. Org. Phase, ppm** | 12.6 | 20.0 | 4.89 | 20.9 | 1.14 | 5.69 | 3.94 | 1.02 | 48.5 | 2.55 | 4.8 | 314 | 179 |
| 0.05 M.HCl | 1 × 10 ml, | % Removed by Wash | 19.1 | 4.7 | ~0 | 2.6 | <0.3 | <4.4 | ~0 | <5.6 | <0.10 | ~0 | ~50 | 0.8 | 28.9 |
| 0.05 M.HNl$_3$ | 1 × 10 ml, | % Removed by Wash | 10.7 | 2.2 | ~0 | 1.0 | <0.3 | <4.4 | ~0 | <5.6 | <0.10 | ~0 | ~50 | 0.8 | 27.6 |
| 0.05 M.H$_2$SO$_4$ | 1 × 10 ml, | % Removed by Wash | 54.0 | 30.4 | 13.5 | 17.5 | 1.1 | <4.4 | ~0 | <5.6 | <0.10 | ~0 | ~50 | 0.9 | 30.8 |

*Based on results of complete backstrip in 3 M.HNO$_3$ using multiple applications and analysis of aqueous strip solution.
**Based on difference in init. leach soln. on solvent extraction.

EXAMPLE 5

Starting with aqueous sulphurous acid leach solutions at a pH value of approximately 2.0, a typical composition of which is shown at the foot of Table 6, solvent extractions were carried out at room temperature using organic phases consisting of solutions of single and mixed organo-phosphorus extractants at various concentrations in a number of organic diluents by contacting the aqueous and organic phases for 15 minutes at an aqueous:organic volume ratio of 1:1. The aqueous phases were analyzed before and after the extraction operations for typical rare-earth extraction of the analyzed elements were calculated. The impurities subsequently backstripped from the organic phases using 3M HNO$_3$ are also reported on an original volume basis. Typical results are shown in Table 6.

From Table 6 it can be seen that of the solvents examined DEHPA gives the greatest extraction effect, especially for the lighter rare earth elements, followed by EHEHPA and then by Cyanex 272. Cyanex 301 (thiophosphinic acid type of extractant), for which results are not shown in Table 6, extracted approximately 10% of the yttrium from the aqueous phase at a concentration of 1M in kerosine, but extracted essentially none of the other rare earth elements. More concentrated solutions of DEHPA and EHEHPA up to 1M (results not shown in Table 6) gave good extractions of the light as well as of the heavy rare earths, but with the penalty of an increased transfer of iron and calcium impurities into the final backwash solution.

It can be seen that the use of the relatively weak extractant Cyanex 272 would be of considerable interest if it were desired to selectively extract only the yttrium and valuable heavy rare earths from an aqueous sulphurous acid leach solution.

It can also been seen that on increasing the concentration to 0.2 and 0.4 M of a phosphorus-containing organic co-extractant such as TOPO (which is not believed to operate by an ion-exchange mechanism as in the case of DEHPA, EHEHPA and Cyanex 272) causes the degree of extraction of the light and middle rare earth metals to fall off while not significantly changing that of the yttrium and heavy rare earths. This therefore also provides a means for increasing the selectivity of the extraction of the latter when this is desirable.

TABLE 6

| Extractant | Concn. | Diluent | EFFECTS OF EXTRACTANT | | | | | | | | | | | | | | |
|---|---|---|---|---|---|---|---|---|---|---|---|---|---|---|---|---|---|
| | | | % Extraction | | | | | | | | | | ppm Impurities in Backstrip | | | | |
| | | | La | Ce | Pr | Nd | Eu | Gd | Dy | Ho | Y | Er | Fe | Al | Na | Si | Ca |
| DEHPA | 0.1 M | Hexane | 14.1 | 34.9 | 36.9 | 54.3 | 89.8 | 91.9 | 83.7 | 87.6 | 99.9 | 89.6 | <1.3 | 112 | 0.59 | 0.49 | 19.3 |
| EHEHPA | 0.1 M | Hexane | 4.2 | 19.6 | 28.0 | 42.1 | 86.8 | 89.8 | 85.7 | 83.9 | 99.9 | 86.3 | <1.3 | 219 | 1.0 | 0.48 | 4.0 |
| CYNEX 272 | 0.1 M | Hexane | 1.3 | 2.1 | 3.0 | 2.1 | 27.5 | 34.1 | 77.7 | 72.3 | 95.8 | 80.5 | <1.3 | 31 | 0.43 | 1.7 | 3.0 |
| EHEHPA | 0.2 M | Kerosine | 3.1 | 11.9 | 17.2 | 25.2 | 84.1 | 88.4 | 88.1 | 88.6 | 99.8 | 90.2 | <1.3 | 131 | <0.3 | 1.12 | 4.4 |
| EHEHPA +TOPO | 0.2 M 0.2 M | Kerosine | 2.9 | 5.2 | 3.7 | 11.7 | 65.5 | 78.0 | 86.7 | 85.9 | 99.5 | 88.0 | <1.3 | 76 | 0.53 | 1.44 | 4.1 |
| EHEHPA +TOPO | 0.2 M +0.4 M | Kerosine | 1.7 | 5.2 | 0.7 | 3.6 | 46.7 | 58.9 | 85.1 | 83.9 | 98.9 | 86.5 | <1.3 | 79 | <0.3 | 3.1 | 3.3 |
| Typical Aqueous Phase, ppm | | | 28.1 | 24.4 | 6.8 | 21.7 | 0.99 | 5.5 | 4.0 | 1.0 | 41.8 | 2.5 | 24.8 | 581 | 1202 | 417 | 850 |

EXAMPLE 6

Various organic phases were used for the extraction of rare earth elements from sulphurous acid leach solutions. The loaded organic phases thus produced were then subjected to backstripping using aqueous 3M NHO$_3$ solutions as the stripping medium, which in these cases was applied in six portions of 10 mL each per 50 mL of organic phase, with each portion being contacted with the organic phase for 5 minutes at room temperature in the presence of a few drops of 2-ethyl-1-hexanol as a modifier.

The concentrations of several of the rare earth elements and typical impurities in the organic phase were calculated by difference from the analyses of the original aqueous sulphurous acid solutions before and after extraction with the organic phase, and the concentrations in the combined aqueous backstrip portions were also determined by analysis and converted to the original volume basis to permit direct comparison with the organic phase concentrations, after which the percentage of each element originally in the organic phase which was backstripped into the aqueous nitric acid stripping medium was calculated.

Table 7 shows typical results of such tests in which the diluent of the organic phase consisted of hexane. In this Table, lanthanum (La) and cerium (Ce) can be taken as representing the behaviour of the light rare earth elements, gadolinium (Gd) that of the middle rare earth elements, and holmium (Ho) and erbium (Er) that of the heavy rare earth elements. Results are presented separately for yttrium. The results for calcium (Ca) can be taken as typical of the behaviour of the most troublesome impurity elements.

Table 7 shows that the backstripping of the light and middle rare earth elements by 3M $HNO_3$ occurs efficiently and without problems. However, when DEHPA is used as the extractant in particular, it becomes increasingly difficult to efficiently backstrip the yttrium and valuable heavy rare earth elements as the DEHPA concentration in the organic phase is increased. Conversely, the backstripping of the undesired Ca impurity increases.

Table 7 also shows that at a given extractant concentration, 1M for example, the degree of backstripping of yttrium and the heavy rare earth elements from the organic phase can be considerably improved by using EHEHPA as the extractant instead of DEHPA. This also leads to decrease in the quantity of Ca impurity backstripped into the final aqueous solution, which can be still further decreased by the use of Cyanex 272 as the extractant, so as to improve the purity of the rare earth concentrate produced finally from the backstrip solution if this is desired.

TABLE 7

BACKSTRIPPING OF RARE EARTHS FROM ORGANIC PHASE
Backstrip Medium: 3 M.$HNO_3$ Solution, applied in 6 portions of 10 mL/50 mL Org. Phase
5 Min. Contact/Portion, Room Temp., in presence of several drops of 2-ethyl-1-hexanol.

| Organic Phase | % Element Backstripped from Org. Phase | | | | | | |
|---|---|---|---|---|---|---|---|
| | La | Ce | Gd | Ho | Y | Er | Ca |
| 0.02 M.DEHPA in Hexane | * | * | 95.1 | 98.5 | 99.9 | ~100 | 20.3 |
| 0.1 M.DEHPA in Hexane | * | 98.9 | 96.2 | 97.4 | 96.7 | ~100 | 23.6 |
| 0.2 M.DEHPA in Hexane | ~100 | ~100 | 95.4 | 97.9 | 97.0 | ~100 | 33.5 |
| 0.5 M.DEHPA in Hexane | ~100 | 98.1 | 96.7 | 91.1 | 76.1 | 73.0 | ~100 |
| 1.0 M.DEHPA in Hexane | 98.3 | ~100 | 96.7 | 60.0 | 38.1 | 31.8 | ~100 |
| 1.0 M.EHEHPA in Hexane | 96 | ~100 | 90.7 | 90.0 | 91.7 | 92.6 | 19.0 |
| 1.0 M.CYANEX 272 in Hexane | * | * | 86.8 | 91.0 | 91.8 | 90.6 | 0.6 |

*Low extraction into organic phase leads to poor accuracy in analysing backstrip solutions.

We claim:

1. A process for the recovery of rare earths from Bayer process red mud which comprises:
   (a) digesting red mud containing rare earths together with iron, sodium, calcium, alumina and silica values in a dilute mineral acid solution to obtain a final digestion slurry having a pH of about 1.8 to 3 whereby rare earths are selectively dissolved while leaving iron in the read mud substantially undissolved;
   (b) separating the solution obtained containing rare earths from the remaining insoluble components, and
   (c) recovering the rare earth elements from said solution.

2. A process according to claim 1 wherein the rare earths include at least one of the rare earth elements of atomic number from 57 to 71 and yttrium.

3. A process according to claim 1 wherein the digestion acid comprises sulphur dioxide dissolved in water.

4. A process according to claim 3 wherein the digestion is carried out in at least two stages at decreasing pH values.

5. A process according to claim 3 wherein the digestion is carried out at temperatures up to ambient temperature.

6. A process according to claim 4 wherein sodium, calcium, aluminum and silica values are dissolved in the first digestion stage, the remaining insoluble material is separated from the solution, the separated insoluble material is subjected to a second digestion at a lower pH with sulphur dioxide dissolved in water to dissolve the rare earths together with further aluminum, silica and calcium and the rare earth elements are recovered from the solution obtained.

7. A process according to claim 6 wherein the slurry at the end of the first digestion stage has a pH of about 2.6 to 3.2 and the slurry at the end of the second digestion stage has a pH of about 1.8 to 2.5.

8. A process according to claim 4 wherein the digestion is carried out in three stages at decreasing pH values with sodium, calcium, aluminium and silica values being dissolved in a first digestion stage at a pH of about 2.6 to 3.2, much of the rare earths and most of the remaining calcium, aluminum and silica values in the remaining insoluble material being dissolved in a second digestion stage at a lowered pH value and the remaining insoluble material from the second digestion stage being subjected to a third digestion at a still lower pH value of about 1.5 to 2.0 to dissolve further rare earth values and very low concentrations of calcium, aluminum and silica values.

9. A process according to claim 3 wherein less than 120 ppm of iron is dissolved during the digestion.

10. A process according to claim 3 wherein the rare earth elements are recovered from the solution by solvent extraction.

11. A process according to claim 3 wherein the solvent extractant is an organo-phosphorus compound.

12. A process according to claim 11 wherein the extractant is 2-ethylhexylphosphonic acid mono-2-ethylhexyl ester.

13. A process according to claim 11 wherein the extractant is di-2-ethylhexyl phosphoric acid.

14. A process according to claim 11 wherein the extractant is dissolved in an aliphatic or aromatic diluent.

15. A process according to claim 11 wherein the extractant is dissolved in kerosene.

16. A process according to claim 10 wherein the loaded organic solvent obtained from the extraction step is washed with very dilute acid to selectively strip calcium therefrom.

17. A process according to claim 16 wherein the washed organic solvent is further washed with a moderately concentrated aqueous solution of mineral acid to strip rare earth elements therefrom.

18. A process according to claim 10 wherein acid containing streams from the digestions and solvent extractions are collected and heated to drive off sulphur dioxide and cause precipitation of $SiO_2$ values.

19. A process according to claim 18 wherein the sulphur dioxide is recovered and recycled to the digestion stage.

20. A process according to claim 18 wherein the acid containing stream is further heated to drive off more sulphur dioxide for recovery and cause precipitation of $Al_2O_3$ values.

21. A process according to claim 12 wherein the extractant is dissolved in an aliphatic or aromatic diluent.

22. A process according to claim 12 wherein the extractant is dissolved in kerosene.

* * * * *